US010828970B2

(12) United States Patent
Richards et al.

(10) Patent No.: US 10,828,970 B2
(45) Date of Patent: Nov. 10, 2020

(54) HOUSING ASSEMBLIES FOR VEHICLE DOOR ACTUATION ASSEMBLIES AND METHODS OF INSTALLING THE SAME

(71) Applicant: Toyota Motor Engineering & Manufacturing North America, Inc., Plano, TX (US)

(72) Inventors: Frank A. Richards, Ann Arbor, MI (US); Tarakorn Soonthornwinate, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 122 days.

(21) Appl. No.: 16/259,659

(22) Filed: Jan. 28, 2019

(65) Prior Publication Data
US 2020/0238800 A1    Jul. 30, 2020

(51) Int. Cl.
*B60J 5/06*        (2006.01)
*E05F 15/646*      (2015.01)

(52) U.S. Cl.
CPC ............... *B60J 5/06* (2013.01); *E05F 15/646* (2015.01); *E05Y 2201/434* (2013.01); *E05Y 2900/531* (2013.01)

(58) Field of Classification Search
CPC ..... B60J 5/06; E05F 15/646; E05Y 2201/434; E05Y 2900/531
USPC ........................................................ 296/155
See application file for complete search history.

(56) References Cited

U.S. PATENT DOCUMENTS

| 6,485,094 | B2* | 11/2002 | Corder | B60J 5/0479 |
| | | | | 296/106 |
| 6,966,148 | B2* | 11/2005 | Choi | E05F 11/483 |
| | | | | 49/360 |
| 7,337,581 | B2* | 3/2008 | Kriese | B60J 5/06 |
| | | | | 296/155 |
| 8,690,225 | B2* | 4/2014 | Ginn | E05F 15/646 |
| | | | | 296/155 |

FOREIGN PATENT DOCUMENTS

| CN | 1084820 C | 5/2002 |
| DE | 102004018444 A1 | 10/2005 |
| DE | 202005014450 U1 | 2/2007 |
| EP | 1915267 B1 | 2/2010 |
| FR | 2876065 B1 | 2/2008 |
| JP | 3596598 B2 | 12/2004 |
| JP | 2007132141 A | 5/2007 |

* cited by examiner

*Primary Examiner* — Pinel E Romain
(74) *Attorney, Agent, or Firm* — Dinsmore & Shohl LLP

(57) ABSTRACT

An actuation assembly for actuating a door of a sliding door assembly of a vehicle includes a motor inside a motor housing, a mid-pulley assembly comprising a mid-pulley wheel, a guide pulley assembly comprising a guide-pulley wheel, and a cable anchored to the vehicle and operatively coupling the mid-pulley assembly, the guide pulley assembly, and the motor. The motor turns to move the door along the cable and at least some portion of the cable is encased in a unitary casing.

20 Claims, 9 Drawing Sheets

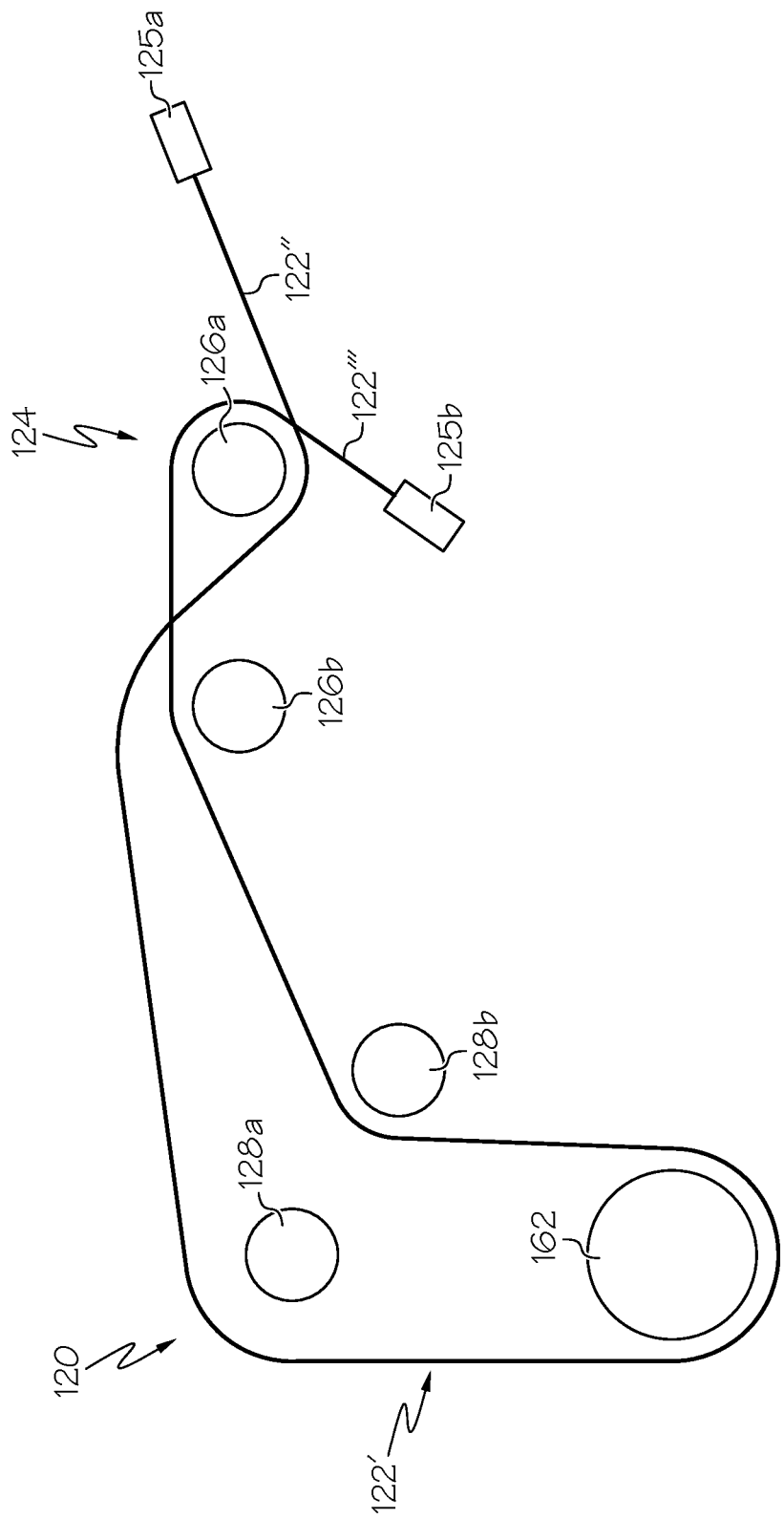

HOUSING ASSEMBLIES FOR VEHICLE DOOR ACTUATION ASSEMBLIES AND METHODS OF INSTALLING THE SAME

TECHNICAL FIELD

The present specification generally relates to automatically actuated vehicle doors and, more specifically, to housing assemblies for vehicle door actuation assemblies and methods of installing the same.

BACKGROUND

Certain vehicle doors may include assemblies for automatically opening and closing the door. These assemblies may include a motor, a motor controller, one or more pulleys, and one or more cables for connecting the motor with the door through the pulley. The motor may serve as an actuating mechanism for opening and closing the door. In some instances, the motor may actuate causing the door to open and close in the vehicle longitudinal direction. As the motor turns, cables may pull the door open and closed in the vehicle longitudinal direction along a track.

Actuation assemblies that couple a motor with a door may include a multitude of complex parts and interconnections. These parts and interconnections may require maintenance from time to time and it may be generally desirable to prevent the introduction of foreign objects such as dirt and debris into the actuation assemblies. Accordingly, housing assemblies for vehicle door actuation assemblies and methods of installing the same may be desired.

SUMMARY

In one embodiment, an actuation assembly for actuating a door of a sliding door assembly of a vehicle includes a motor inside a motor housing, a mid-pulley assembly comprising a mid-pulley wheel, a guide pulley assembly comprising a guide-pulley wheel, and a cable anchored to the vehicle and operatively coupling the mid-pulley assembly, the guide pulley assembly, and the motor. The motor turns to move the door along the cable and at least some portion of the cable is encased in a unitary casing.

In another embodiment, a vehicle includes an actuation assembly for actuating a door of a sliding door assembly. The actuation assembly includes a motor inside a motor housing, a mid-pulley assembly comprising a mid-pulley wheel, a guide pulley assembly comprising a guide-pulley wheel, and a cable anchored to the vehicle and operatively coupling the mid-pulley assembly, the guide pulley assembly, and the motor. The motor turns to move the door along the cable and at least some portion of the cable is encased in a unitary casing.

In yet another embodiment, a method of installing an actuation assembly in a sliding door assembly includes installing the actuation assembly into a door, the actuation assembly comprising a motor inside a motor housing, a mid-pulley assembly comprising an input gear, a first cable comprising a first portion and a second portion operatively coupling the mid-pulley assembly and the motor, and a unitary casing surrounding the first portion and the second portion, and removing the unitary casing from around the first portion and the second portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3B schematically depicts a cable, a mid-pulley assembly, a guide pulley assembly, and a drum of the actuation assembly of FIG. 3A, according to one or more embodiments shown and described herein;

DETAILED DESCRIPTION

Vehicle door assemblies may include a plurality of mechanical and electrical components that must be assembled on a vehicle assembly line or at another location and installed on a vehicle so that the door can be used together with other vehicle systems. For example, the door assembly may be electrically coupled to an electrical system of the vehicle and one or more mechanical components of the door assembly may be fitted on or otherwise connected or installed on the door assembly or the vehicle such that they interact with other vehicle components as designed. Component interaction may require careful alignment and precise placement due to relatively tight design tolerances. Moreover, maintaining functionality of the door assembly over its useful life may require the inhibition of the introduction of foreign objects such as dirt and debris during the installation of the door assembly and through the life of the vehicle.

Additionally, installation of door assembly components may be complicated by the relative numerosity, size, and discontinuous quality of door assembly components. That is, the greater the number of components, the smaller the size of such components, and the less monolithic the door assembly, the more difficult it may be to install and maintain.

Accordingly, housing assemblies for vehicle door actuation assemblies and methods of installing the same are required.

Figure 1:
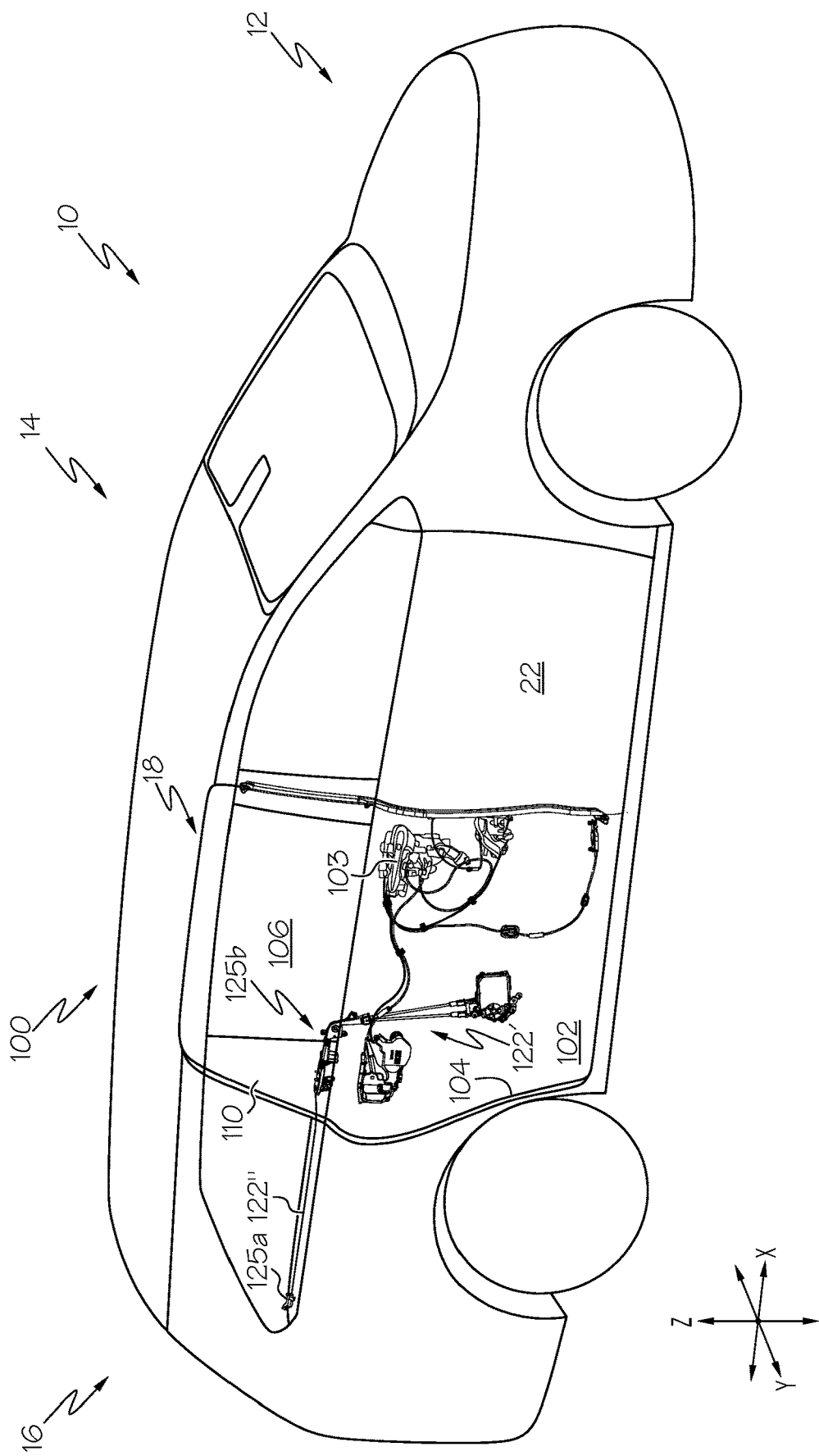
FIG. 1 schematically depicts a vehicle including an automatically actuated vehicle door including an actuation assembly, according to one or more embodiments shown and described herein.

Referring now to FIG. 1, a vehicle 10 with a sliding door assembly 100 is shown. The vehicle 10 may include a front portion 12, a middle portion 14, and a rear portion 16. The sliding door assembly 100 may slide a door 102 in an X-Z plane of the vehicle (that is, in the vehicle longitudinal direction). The door 102 may open and close in a door opening 18 that allows access to a cabin. The cabin may include one or more seats. The seats may be pilot seats, bench seats, bucket seats, or any other type of vehicle seat. The door 102 slides from a forward, closed position to a rearward, open position to provide access to the cabin and the seats. One or more components for opening and closing the door 102 are housed within a volume incorporated by the door 102 itself and are described in greater detail herein. One or more components for opening and closing the door 102 may be housed within other portions of the vehicle 10.

The front portion 12 may include a driver side door (not shown) and a passenger side door 22. In some embodiments, the passenger side door 22 may be of a unitary panel construction or may include multiple panels, for example, the passenger side door may include a top panel or other panels. The passenger side door 22 may generally pivot in and out at a pivot point allowing access to a passenger seat (not shown) and the passenger side door 22 and the unitary panel or multiple panels may be generally flush with other components of the body of the vehicle 10 when the passenger side door 22 is in a closed position as shown.

The vehicle 10 includes the right sliding door assembly 100 (referred to herein as the "sliding door assembly 100") and a left sliding door assembly (not shown) that is substantially similar and mirrored to the right sliding door assembly 100. It should be understood that, in some embodiments, the left sliding door assembly may include substantially similar components in a substantially similar arrangement as the right sliding door assembly 100 and operate in a substantially similar way, but that not all of the features and/or components are mirrored in all embodiments. It is to be understood that some embodiments of the vehicle 10 may include only a right sliding door assembly or a left sliding door assembly. Additionally, while the particular vehicle 10 shown is a van, it is to be understood that the systems, methods, and principles of operation described herein could be applied to any vehicle body style, including for example, a truck, a sedan, an SUV, etc.

The sliding door assembly 100 includes the door 102. In some embodiments, the door 102 includes an outboard panel 104 (shown in phantom) that may be a single panel construction. In other embodiments, the outboard panel 104 may include one or more separate panels. The door 102 may also include a window 106, and one or more garnishes, for example, a forward garnish and a rear garnish. In some embodiments, the door 102 may include additional garnishes, for example, an interior garnish (not shown). One or more electronic or mechanical components for actuating the sliding door assembly 100 may be installed between the outboard panel 104 and the cabin of the vehicle 10. In some embodiments, the door 102 may include a handle 103. The door 102 may be configured such that it automatically opens (i.e., travels from the forward, closed position to the rearward, open position) with just a pull of the handle 103 in the outward direction. That is, in some embodiments, it may not be necessary for a user to actually apply a force to the door 102 itself, but rather, once the handle 103 has been pulled in the outward direction (+Y), the assemblies that automatically open and/or close the door may actuate and cause the door to automatically open as described in greater detail herein. Additionally, the door 102 may be configured such that it automatically closes (i.e., travels from the rearward, open position to the forward, closed position) with just a pull of the handle 103. In some embodiments, operation of the door may be activated by an electric switch, for example.

In some embodiments, the door 102 may be supported on the frame of the vehicle 10 at three or more points. Two of the support points may be slidably fixed within a track (not shown) near the bottom of the door 102. The track may curve inwardly toward the front of the vehicle with respect to the longitudinal dimension of the track or the track may be straight. A curved track may allow the door 102 to slide inward and outward along the track as it is translated in the vehicle longitudinal direction (i.e., in the X-Z plane), allowing the door 102 to engage with the body of the vehicle 10 and latch and/or lock in a closed position such that the various panels of the door 102 and the window 106 are generally flush with other external portions of the vehicle 10 such as the passenger side door 22. The door 102 may slide outwardly in the vehicle lateral direction (+/−Y) as it moves backward (−X) in the vehicle longitudinal direction such that the door 102 is separated from the right side of the rear portion 16 of the vehicle 10. Other door support points may be located near a top or a center of the door 102.

The sliding door assembly 100 may be electrically and/or automatically operated such that it can be opened and closed automatically. Additionally, automatic operation may be triggered remotely or locally. For example, using a remote electric key fob or using a handle as described herein. Accordingly, the sliding door assembly 100 may include one or more components that actuate the sliding door assembly 100 and/or provide electric power or motive force to the sliding door assembly 100. Embodiments of the sliding door assembly 100 may include an actuating mechanism or actuating mechanisms for actuating the sliding door assembly 100 and may be electrically coupled to one or more sources of electrical power, for example, a vehicle battery (not shown) that may be housed in a front portion 12 of the vehicle 10. Because one or more components requiring electrical power may be housed within the body of the door 102 itself (e.g., a motor), one or more electrical connections may transfer electrical power from the vehicle 10 to the components in the sliding door assembly 100 and one or more physical electrical connections may exist between the door 102 and the body of the vehicle 10.

Figure 2:
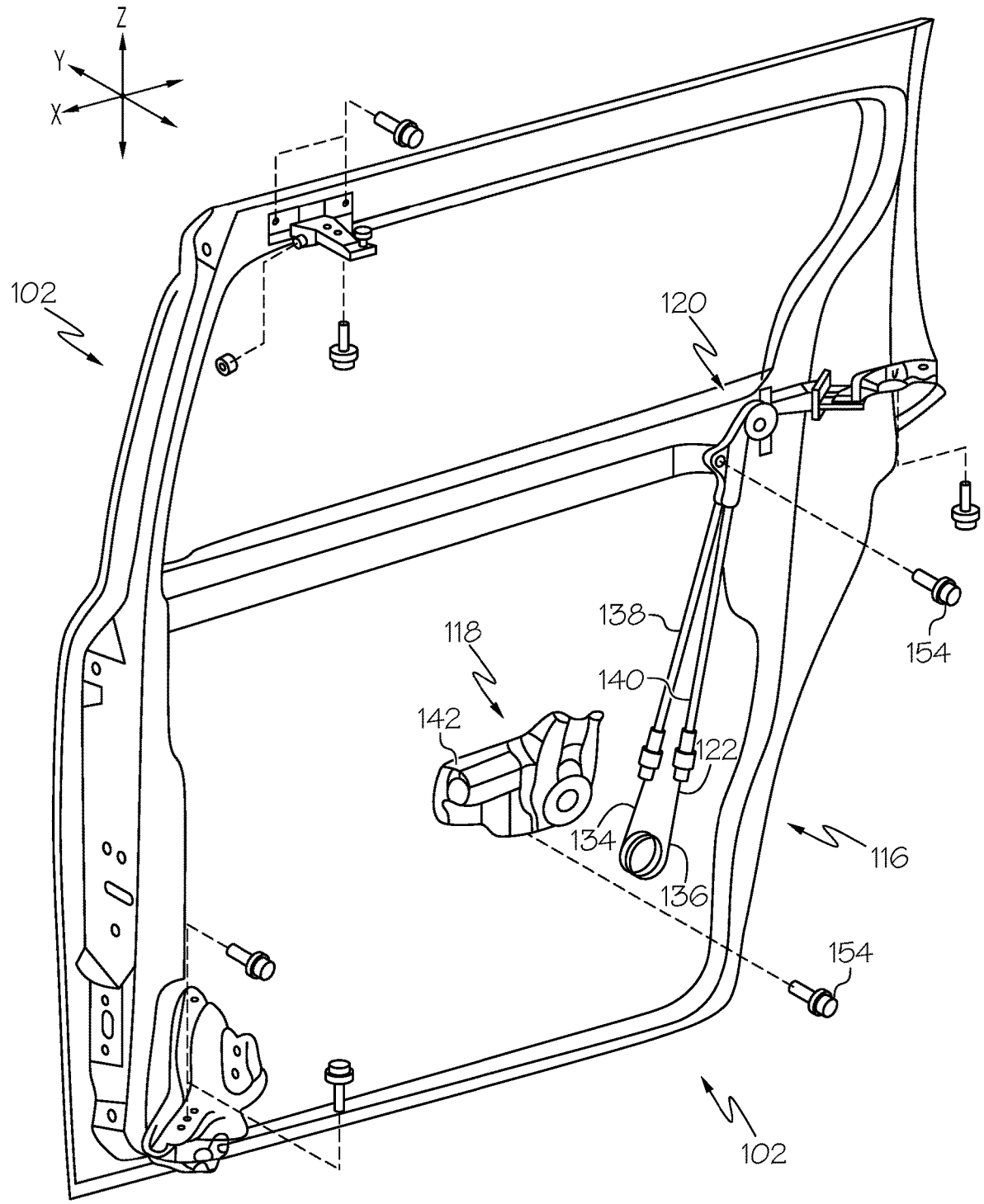
FIG. 2 schematically depicts the automatically actuated vehicle door of FIG. 1 including an actuation assembly, according to one or more embodiments shown and described herein.

Referring now to FIGS. 2 and 3, internal components of the sliding door assembly 100 that enable the automatic actuation of the door 102 of FIG. 1 will be described in greater detail. FIG. 2 shows an exploded schematic of an inside view of one potential embodiment the door 102 and FIG. 3 shows various components of the sliding door assembly 100 in exploded schematic.

Figure 3A:
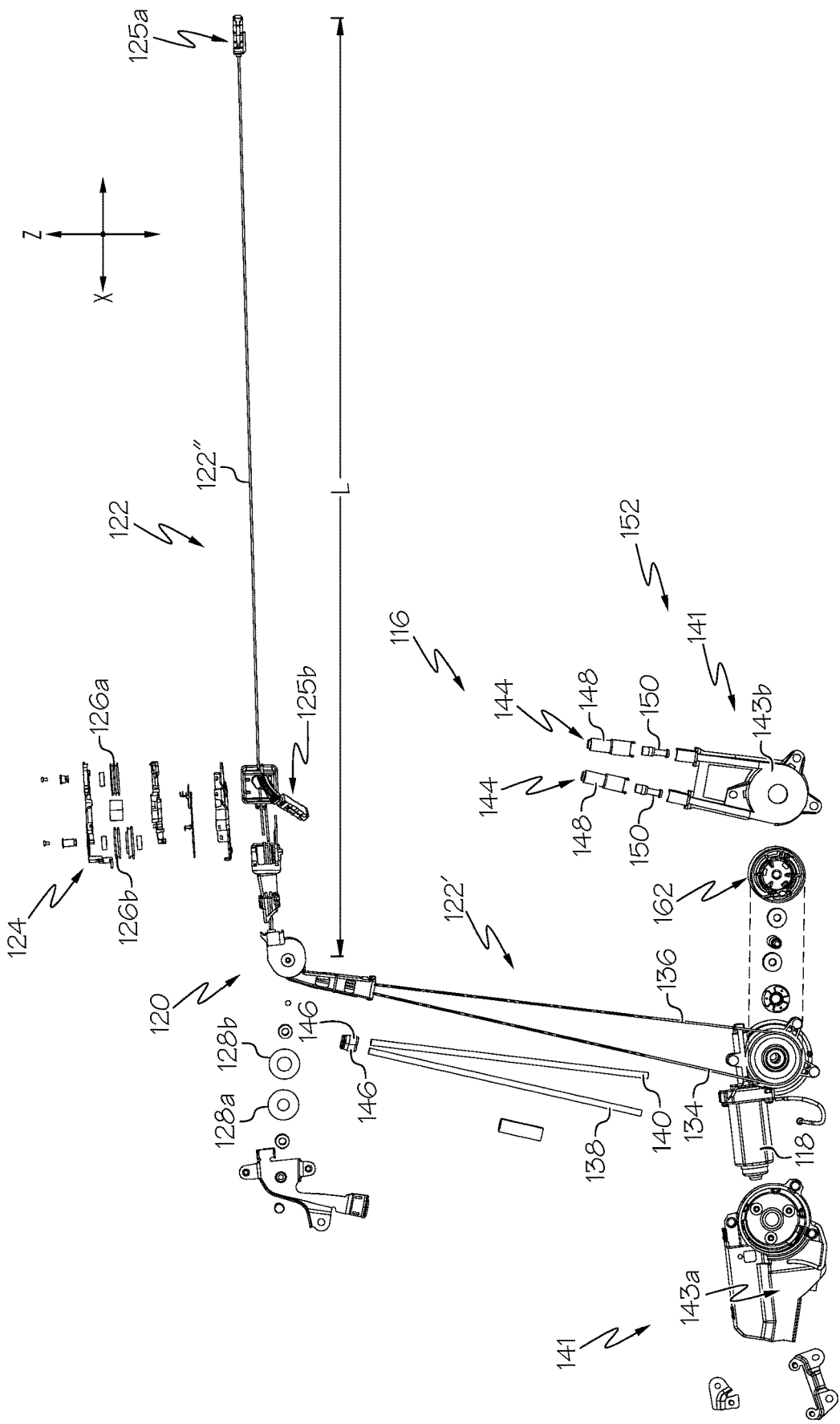
FIG. 3A schematically depicts the actuation assembly of FIG. 2 in an exploded schematic view, according to one or more embodiments shown and described herein.

FIG. 2 shows an actuation assembly 116 including a motor 118 inside a motor housing 142 of a motor and drum subassembly 141, a cable 122 that includes a first cable portion 122', a second cable portion 122" (FIG. 3A), and a third cable portion 122''' (FIG. 3B). Referring again to FIG. 2, the first cable portion 122' includes a first segment 134 and a second segment 136. The first segment 134 is encased in a first wire casing 138 and the second segment 136 is encased in a second wire casing 140. The first cable portion 122' surrounds a drum 162 (shown in FIG. 3A) that is mechanically coupled to the motor 118. The motor 118 turns the first cable portion 122' as the motor 118 actuates to open and close the door as explained in greater detail herein. FIG. 2 also shows the first cable portion 122' connected to a mid-pulley assembly 120 through the first wire casing 138 and the second wire casing 140. The mid-pulley assembly 120 is fixed to the door 102 and operatively coupled between the first cable portion 122' and a second cable portion 122" (FIGS. 1 and 3A). A third cable portion 122''' that is not shown in FIG. 3A may be coupled between the second anchor 125b and the guide pulley assembly 124 and may extend and contract as the door moves. The mid-pulley assembly 120 imparts a roughly 90-degree bend to the actuation assembly 116 that changes the direction of operative motion from generally along the Z-axis in the first cable portion 122' to generally along the X-axis such that the door 102 can be moved in the vehicle longitudinal direction as described in greater detail herein. The 90-degree bend may save space in the door assembly.

FIG. 3A shows the actuation assembly 116 in an exploded schematic view including the motor housing 142 exploded from the motor 118 and the first cable portion 122' wrapped around the drum 162 and the second cable portion 122" extending from the mid-pulley assembly 120 through a guide pulley assembly 124. The motor housing 142 includes a first motor housing portion 143a and a second motor housing portion 143b. The cable 122 winds through the various components of the pulley assembly and is anchored at a first anchor 125a and a second anchor 125b. FIG. 3B shows the cable 122 widing around the drum 162, the mid-pulley assembly 120, and the guide pulley assembly 124 in greater detail. The mid-pulley assembly 120 includes a first mid-pulley 128a and a second mid-pulley 128b. The guide pulley assembly 124 includes a first guide pulley 126a and a second guide pulley 126b. The motor 118 turns the drum 162 to turn the cable 122 clockwise or counterclockwise. As the drum 162 turns and winds the first cable portion 122', the relative position of the door actuation assembly moves between the first anchor 125a and the second anchor 125b along the length L of the cable 122.

Still referring to FIGS. 3A and 3B, the sliding door assembly 100 may include a casing assembly 152 that includes the first wire casing 138, the second wire casing 140, casing caps 144 that include a fixing cap 148 and an end cap 150, and upper casing caps 146. The casing assembly 152 extends between the mid-pulley assembly 120 and generally surrounds the first segment 134 and the second segment 136 of the cable 122 and may generally inhibit the introduction of foreign objects such as dirt, dust, and/or debris into the actuation assembly 116 as described in greater detail herein.

Referring generally to FIGS. 2, 3A, and 3B, the door 102 is moved back and forth in the vehicle longitudinal direction by the actuation assembly 116. The actuation assembly 116 includes the motor 118, the mid-pulley assembly 120, the cable 122, and the guide pulley assembly 124. The actuation assembly 116 actuates to move the door 102 back and forth in the vehicle longitudinal direction (i.e., along the X-axis). The first cable portion 122' simultaneously winds and unwinds around the drum 162 as the motor 118 actuates. The cable 122 is mechanically coupled between the first anchor 125a and the second anchor 125b through the mid-pulley assembly 120 and the guide pulley assembly 124 such that as the drum 162 turns clockwise or counterclockwise, the relative location of the components of the actuation assembly 116 changes along the operative length L of the cable 122 moving the door 102 to/from an open or closed position.

Still referring to FIGS. 2, 3A, and 3B, the motor 118 may be controlled by a motor controller (not shown), which may be housed in the first housing portion 143a. The motor controller may actuate the motor 118, causing the motor to rotate and to wind the cable 122 to move the actuation assembly 116 by winding the cables about the drum 162. In some embodiments, the motor 118 may be actuated by a remote electronic device, for example, an electronic key. A user may push one or more buttons on the electronic key generating an actuation signal and actuating the actuation assembly 116 and thus causing the door 102 to open or shut on based on the actuation signal. In some embodiments, the motor 118 may be actuated by movement of the handle 103. For example, pulling, pushing, or otherwise manipulating the handle 103 may generate an actuation signal and trigger the motor 118, opening or closing the door 102. Accordingly, in some embodiments a user need not physically strain to slide the door forward or rearward in the vehicle longitudinal direction. Other actuation triggers are contemplated, for example, a proximity trigger based on a proximity of a particular user or object or the proximity of a key fob or other object in connection with the vehicle.

Referring now to FIGS. 3A and 3B, additional components of the sliding door assembly are described. Because, as described above, inhibiting the introduction of dirt, debris, and other foreign objects is desired, the cable 122 or portions thereof may be housed in one or more casings or other components to inhibit the introduction of dirt, debris, and other foreign objects into the system. The first segment 134 and the second segment 136 of the cable 122 may be encased in the first wire casing 138 and the second wire casing 140. The first wire casing 138 and the second wire casing 140 may be hollow cylinders with relatively thin shells that extend substantially the entire length of the first segment 134 and the second segment 136 of the cable 122 between casing caps 144 that connect to a portion of the motor housing 142 and surround the first segment 134 and the second segment 136. The casing caps 144 may include an opening at either end to allow the first segment 134 and the second segment 136 of the cable 122 to pass through the body of the casing caps 144 to pass from the drum 162 to the mid-pulley assembly 120. In some embodiments, one or more of the first wire casing 138, the second wire casing 140, and the casing caps 144 are comprised of a plastic, fiberglass, or other relatively non-pliable, solid material. In some embodiments, the casing caps 144 may comprise two separate pieces, the fixing cap 148 and the end cap 150. The fixing cap 148 may secure the end cap 150 to the second motor housing portion 143b. The fixing caps 148 and the end caps 150 may interface to allow slight movement between the second motor housing portion 143b and the first wire casing 138 and the second wire casing 140 such that the first wire casing 138 and the second wire casing 140 can move in an axial direction along their longitudinal dimension (i.e., substantially in the Z-direction) to allow some flexibility in the actuation assembly 116 as the door 102 operates.

The first wire casing 138 and the second wire casing 140 may connect to the mid-pulley assembly 120 at one or more upper casing caps 146. The upper casing caps 146, first and second wire casings 138, 140, and the casing caps 144 may form the casing assembly 152 that extends between the mid-pulley assembly 120 and generally surrounds the first segment 134 and the second segment 136 of the cable 122. The upper casing caps 146 may include a gasket, a grommet, or other device for preventing introduction of dirt, debris, etc. from entering the space between the first and second wire casings 138, 140 and the cable 122.

In some embodiments, the casing assembly 152 may be installed simultaneously with other portions of the sliding door assembly 100. In some embodiments, the casing assembly 152 may be installed over the first cable portion 122' before assembling the actuation assembly 116 on the vehicle 10. Thus, when the actuation assembly 116 is installed in the door 102, the casing assembly 152 may already be installed over the first segment 134 and the second segment 136 of the first cable portion 122'. Because the first wire casing 138 and the second wire casing 140 are relatively rigid and extend between the motor housing 142 and the mid-pulley assembly 120, the casing assembly 152 may impede installation of the actuation assembly 116 and/or movement of the actuation assembly 116 once it is installed. Additionally, in some embodiments, one or more portions of the casing assembly 152 may become filled with dirt, debris, and other foreign objects over the useful life of the vehicle 10.

Figure 4:
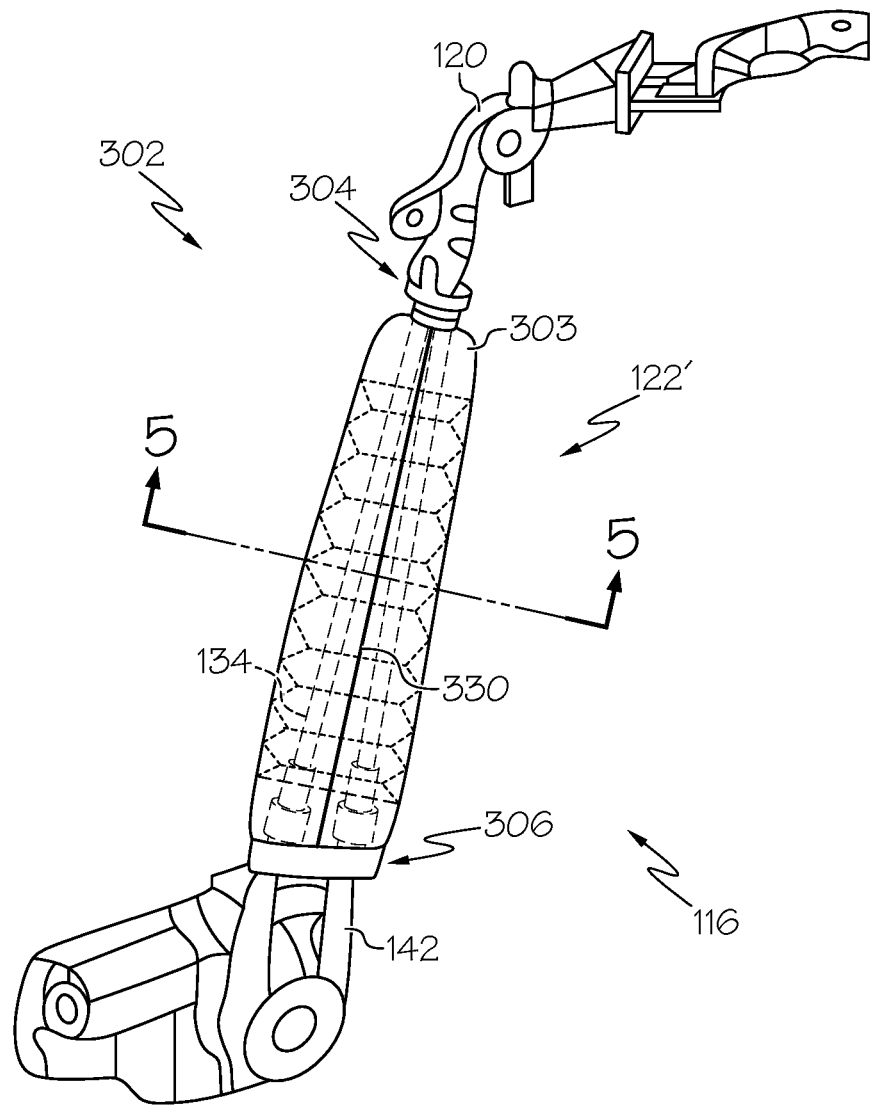
FIG. 4 schematically depicts a casing for encasing one or more components of the actuation assembly, according to one or more embodiments shown and described herein.

It may be beneficial to reduce the number of parts in the casing assembly. Referring to FIG. 4, a unitary casing 302 may surround the first cable portion 122'. The unitary casing 302 may be a casing with a continuous outer shell that surrounds at least a portion of both the first segment 134 and the second segment 136 between the motor housing 142 and the mid-pulley assembly 120. In some embodiments, the unitary casing 302 may supplant the first wire casing 138 and the second wire casing 140 and the actuation assembly 116 may not include a first wire casing 138 and a second wire casing 140.

The unitary casing 302 may comprise an outer shell 303 and may extend longitudinally from a top end 304 to a bottom end 306. The top end 304 may be connected to the mid-pulley assembly 120 and the bottom end 306 may be connected to the motor housing 142. Accordingly, in some embodiments, when the unitary casing 302 is installed around the first cable portion 122', no portion of the first cable portion 122' may be exposed. In some embodiments, the top end 304 the bottom end 306, or both are connected to their respective piece of the actuation assembly 116 with a selective attachment feature, for example, a clasp, a button, a hook, hook-and-loop fastener, or other attachment feature. Accordingly, the top end 304 and the bottom end 306 may be selectively attached to the mid-pulley assembly 120 and to the motor housing 142, respectively. As the actuation assembly 116 is installed in the door 102, the unitary casing 302 may be removed from the actuation assembly 116 as described in greater detail herein.

Still referring to FIG. 4, in some embodiments, the unitary casing 302 may be a flexible bag. The flexible bag may be constructed from one or more pliable sheets of fabric that extend in a longitudinal dimension of the unitary casing 302 that forms a flexible, tube-like structure between the top end 304 and the bottom end 306. The fabric may be, for example, canvas, nylon, flexible plastic, or some other type of relatively strong, flexible material that allows movement of the components of the actuation assembly 116 and inhibits dirt, dust, grease, and other constituents from contaminating components of the actuation assembly 116 while the unitary casing 302 is installed.

Still referring to FIG. 4, in some embodiments, the unitary casing 302 may be opened and closed along a length or some other dimension of the unitary casing 302 using a fastener 330 (e.g., a zipper, hook-and-loop fasteners, buttons, etc.). In some embodiments, the fastener 330 may form a seam along the length of the unitary casing 302. In embodiments including the fastener 330, the fastener 330 may extend an entire longitudinal dimension of the unitary casing 302 or may extend merely a portion or portions of the unitary casing 302. A seam of the unitary casing 302 may be opened and closed using the fastener 330 to facilitate installation and/or removal of the unitary casing 302 or access to portions of the actuation assembly 116 or installation of the actuation assembly 116. For example, the fastener 330 may be opened to clean, repair, and/or replace the cable 122. In some embodiments, the unitary casing 302 may not include a fastener 330.

Figure 5:
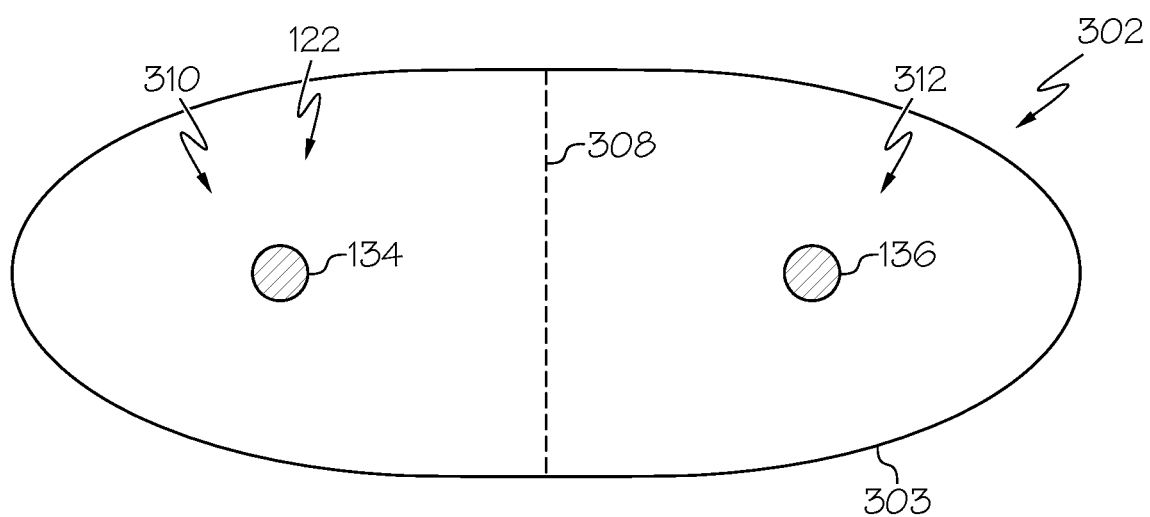
FIG. 5 schematically depicts a unitary casing including an outer shell, according to one embodiments shown and described herein.

Briefly referring to FIG. 5, in some embodiments, the unitary casing 302 may include one or more compartments. For example, the unitary casing 302 may form a single compartment or multiple compartments. FIG. 5 shows one embodiment of the unitary casing 302 surrounding the first segment 134 and the second segment 136 of the cable 122. The unitary casing 302 forms a tube as described herein. In the particular embodiment shown in FIG. 5, the unitary casing is divided by a unitary casing divider 308 that extends from one side of the unitary casing 302 to the other. As shown in FIG. 5, the unitary casing divider 308 divides the unitary casing 302 substantially in half such that each of the two portions of the unitary casing 302 are substantially equal in size, however, it is to be understood that this is merely one potential embodiment of a unitary casing 302 with a unitary casing divider 308 and that other embodiments may not include a unitary casing divider 308 and/or the unitary casing divider 308 may not divide the unitary casing 302 substantially in half.

In embodiments including a unitary casing divider 308, a first casing compartment 310 may surround the first segment 134 and a second casing compartment 312 may surround the second segment 136. In some embodiments, the unitary casing divider 308 may extend an entire longitudinal dimension of the unitary casing 302. In other embodiments, the unitary casing divider 308 may extend merely a portion or portions of the longitudinal dimension of the unitary casing 302. In embodiments, the unitary casing divider 308 may have similar characteristics to the outer shell 303 of the unitary casing 302.

Referring to FIGS. 4 and 5, in some embodiments, the first casing compartment 310 and the second casing compartment 312 may each include a fastener such as the fastener 330 (e.g., a zipper, hook-and-loop fasteners, buttons, etc.) along their longitudinal lengths. Accordingly, the first casing compartment 310 and the second casing compartment may be opened individually permitting access to the first segment 134 and the second segment 136 individually.

In some embodiments, the unitary casing 302 may be made from a plastic, a resin, or a resin composite such as, for example, polypropylene (PP), vinyl, polyethylene (PE) or polytetrafloroethylene (PTFE), or the like, or composite materials including one or more of PP, vinyl, PE or PTFE or the like. In such embodiments, the unitary casing 302 may be made from a single unitary piece of material (i.e., monolithic) or may be made from multiple pieces of resin or other material joined together. Embodiments of the unitary casing 302 that are resin or resin-based structures may be manufactured using any method of manufacturing a composite, for example, blow molding, injection molding, compression molding, extrusion molding, or rotomolding. In such embodiments, the composite matrix may be thermoset and fibers may constitute any percentage of the weight of the unitary casing 302. For example, fibers may constitute between 35-95% of the composite matrix. In other embodiments, fibers may constitute between 45-85% of the composite matrix. In other embodiments, fiber may constitute between 55-75% of the composite matrix. Embodiments having a unitary casing 302 that is resin or partially resin may embody a stiffer axial cross section than embodiments in which the unitary casing 302 is a bag or bag-like structure while still providing sufficient flexure for the unitary casing 302 to move with respect to the door 102 as described herein.

Figure 6:
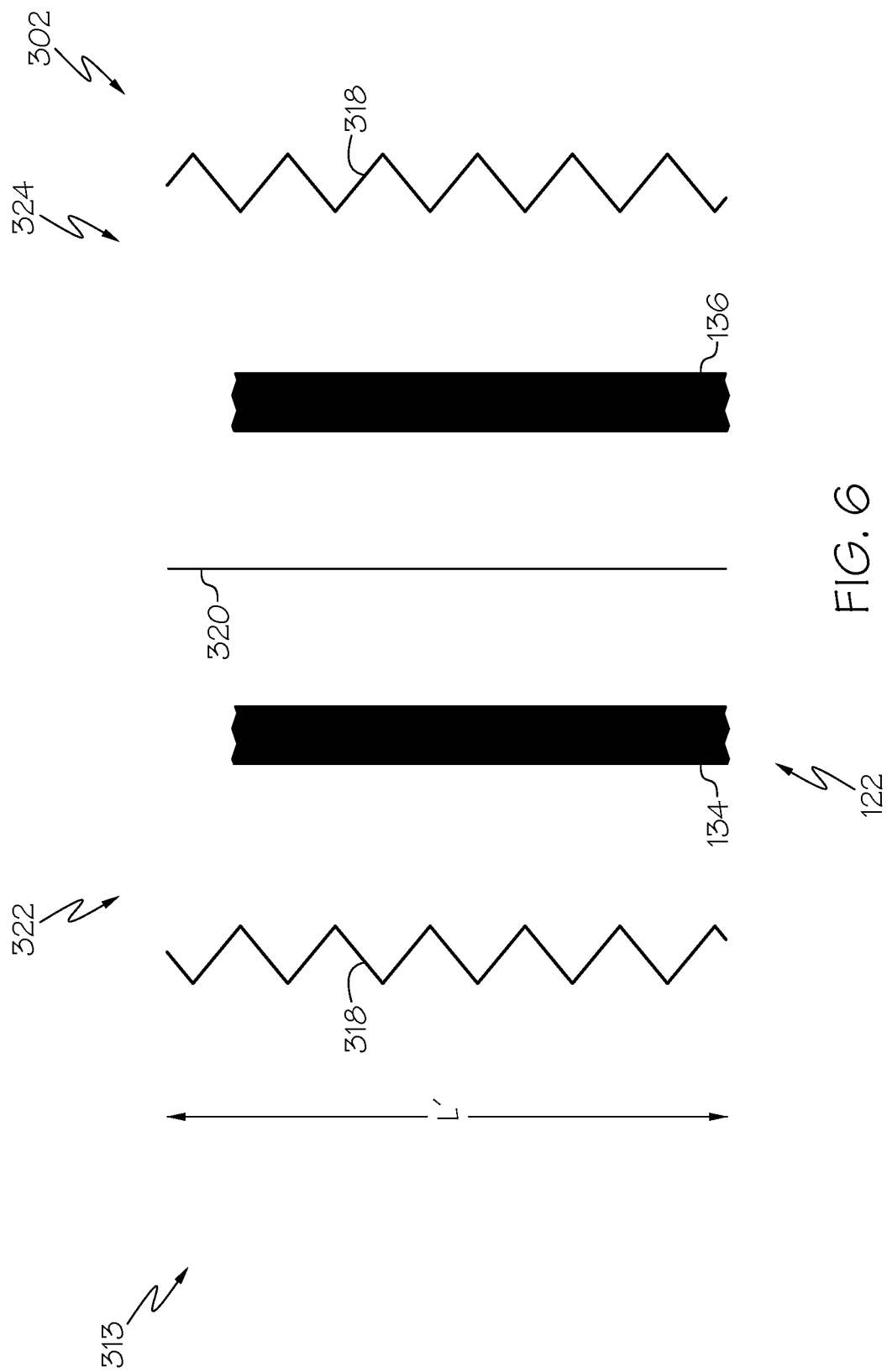
FIG. 6 schematically depicts an embodiment of a unitary casing including a unitary casing in the form of an accordion bag, according to one or more embodiments shown and described herein.

FIG. 6 shows a portion of an embodiment of the unitary casing 302 in the form of an accordion bag 313 with a plurality of collapsible panels 318 that form an outer wall of the unitary casing 302. The collapsible panels 318 may enable the accordion bag 313 to stretch and contract along its length dimension L' enabling the accordion bag 313 to stretch and contract with the movement of the actuation assembly 116. Some embodiments of the accordion bag 313 may only include the collapsible panels 318. For example, an outer wall of the accordion bag 313 may be constructed of only collapsible panels 318. In some embodiments, the collapsible panels 318 are made from plastic, vinyl, PP, PE, PTFE, or the like. Some embodiments of the accordion bag 313 may include an inner divider 320 that divides the accordion bag 313 into two chambers: a first chamber 322 and a second chamber 324. When the accordion bag 313 is installed around the first cable portion 122', the first chamber 322 and the second chamber 324 may surround the first segment 134 and the second segment 136 of the cable 122.

Still referring to FIG. 6, in embodiments in which the unitary casing 302 is an accordion bag 313, one or more components of the accordion bag 313 may be made from a plastic, a resin, or a resin composite such as, for example, polypropylene (PP), vinyl, polyethylene (PE) or polytetrafloroethylene (PTFE), or the like, or composite materials including one or more of PP, vinyl, PE or PTFE or the like. The individual components of the accordion bag 313 may be made from multiple pieces of resin or other material joined together. Embodiments of the accordion bag 313 that are resin or resin-based structures may be manufactured using any method of manufacturing a composite, for example, blow molding, injection molding, compression molding, extrusion molding, or rotomolding. In such embodiments, the composite matrix may be thermoset and fibers may constitute any percentage of the weight of the unitary casing 302. Embodiments having a resin or partial resin accordion bag 313 may embody a stiffer axial cross section than embodiments in which the unitary casing 302 is a bag or bag-like structure while still providing sufficient flexure for the unitary casing 302 to move with respect to the door 102 as described herein.

Referring now to FIGS. 1-6, installation of the actuation assembly 116 into the door 102 is described. When the sliding door assembly 100 is assembled, the casing assembly 152 and the cable 122 may be installed simultaneously, with the components of the casing assembly 152 pre-installed over the cable 122 between the mid-pulley assembly 120 and the motor housing 142. As shown in FIG. 2, the motor housing 142 and the the mid-pulley assembly 120 may be mounted to the door 102 as indicated by installation bolts 154. In some embodiments, the motor housing 142 and the mid-pulley assembly 120 may be preassembled before they are mounted to the door 102, including any interconnecting portions (e.g., the casing assembly 152). Accordingly, in some embodiments, the motor 118, the motor housing 142, and the mid-pulley assembly 120 can be installed in the door 102 as a single unit along with the unitary casing 302 if it is installed.

In embodiments in which the casing assembly 152, the motor housing 142, and the mid-pulley assembly 120 are installed simultaneously and as a single unit, the casing assembly 152 may surround portions of the actuation assembly 116 when the actuation assembly 116 is installed. In some instances, the casing assembly 152 may not be removed from the actuation assembly 116 over the life of the vehicle 10. During such time, grease, dirt, and other debris or contaminants may build up within the casing assembly 152 causing fouling and/or malfunction of the cables or other components of the sliding door assembly 100. Additionally, access to the cable 122 or other components of the sliding door assembly 100 (e.g., the drum, etc.) may be inhibited by components of the casing assembly 152. Because the cables of the actuation assembly 116 may be subject to wear and other degradation (e.g., fraying, etc.), access to the cables for repair and/or replacement may be required. In the instance that the cable 122 needs to be replaced, such as in the case of a malfunction of the cable 122, a user must first disassemble the casing assembly 152 before manipulating or otherwise accessing the cable 122. Further, some embodiments of the casing assembly 152 may prevent proper flexure and movement between components of the actuation assembly 116. For example, in some embodiments, it may be necessary for the motor 118 to move relative to the mid-pulley assembly 120 up to at least 15 mils, plus or minus 5 mils. In yet other embodiments, it may be necessary for the motor 118 to move relative to the mid-pulley assembly 120 up to at least 10 mils, plus or minus 5 mils. In yet other embodiments, it may be necessary for the motor housing 142 to move relative to the mid-pulley assembly 120 up to at least 5 mils. Accordingly, some embodiments of the sliding door assembly 100 may replace the casing assembly 152 with the unitary casing 302. In some embodiments, the unitary casing 302 may be installed in addition to the casing assembly 152.

Figure 7:
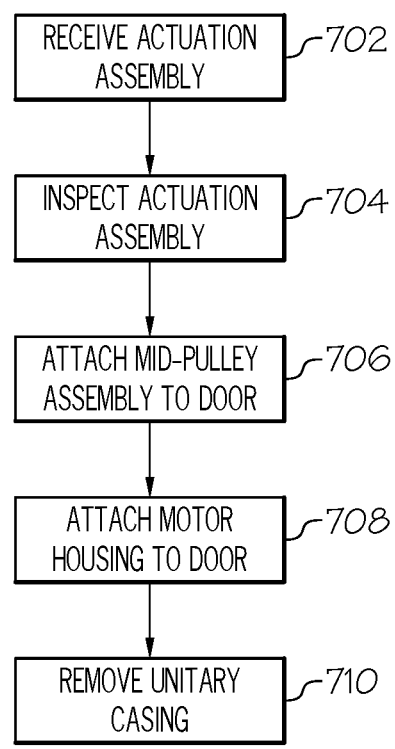
FIG. 7 depicts a method for encasing one or more portions of the cable of FIG. 3A, according to one or more embodiments shown and described herein.

Referring to the method depicted in FIG. 7 and the components shown in FIGS. 1-6, a method for installing an actuation assembly 116 into a sliding door assembly 100 is depicted. At step 702, an actuation assembly 116 is received. In some embodiments, one or more components of the actuation assembly 116 are surrounded by the unitary casing 302. For example, the unitary casing 302 surrounds the first segment 134 and the second segment 136 of the cable 122. The actuation assembly 116 may be inspected prior to installation on the sliding door assembly 100 at step 704.

Once the actuation assembly 116 is received and inspected, installation of the actuation assembly 116 may begin by attaching the mid-pulley assembly 120 to the door 102 at step 706. The actuation assembly 116 may be installed as a unitary assembly by first placing the mid-pulley assembly 120 against the door 102 and bolting the mid-pulley assembly 120 to the door using installation bolts 154 to fix the mid-pulley assembly 120 to the door 102. The full weight of the actuation assembly 116 may thus be supported by the installation bolt 154 between the mid-pulley assembly 120 and the door 102. The unitary casing 302 may be installed around the first segment 134 and the second segment 136 of the cable 122 between the mid-pulley assembly 120 and the motor housing 142 and help to support the weight of one or more of the motor housing 142, the motor 118, and the cable 122.

At step 708, the motor housing 142 may be bolted to the door 102 using the installation bolt 154. The door 102 may then support the weight of the entire actuation assembly 116, including the motor 118 and the motor housing 142 and less stress may be placed on the cable 122 and the unitary casing 302 between the mid-pulley assembly 120 and the motor housing 142. In some embodiments, the unitary casing 302 may be removed once the actuation assembly 116 is installed in the door 102. Accordingly, at step 710, the unitary casing 302 is removed. In embodiments, one or more fastening mechanisms may be decoupled, uninstalled, or otherwise unfastened to remove the unitary casing. For example, in embodiments of the unitary casing 302 having a fastening feature at the top end 304 and the bottom end 306 of the unitary casing, the fastening feature may be unfastened. Additionally, a fastening feature that runs the longitudinal length L' of the unitary casing 302 (e.g., a zipper) may be decoupled.

In some embodiments, the unitary casing 302 may remain coupled to the actuation assembly 116 until such time as repairs may be needed. In such embodiments, the unitary casing 302 may not be removed from the actuation assembly 116 during the initial installation of the actuation assembly 116. In some embodiments, the mid-pulley assembly 120 may be installed before an outer casing, such as the unitary casing 302, is removed. The casing may be removed once the mid-pulley assembly is installed and the motor 118 may then be installed. In some embodiments, the unitary casing 302 may be removed after the the mid-pulley assembly 120 is attached to the door 102 and before the motor housing 142 is attached to the door 102. For example, with brief reference to FIG. 8, some embodiments may include a temporary connection assembly 800 that may be used when installing the mid-pulley assembly 120 and/or the first and second motor housing portions 143a, 143b to the door 102.

Figure 8:
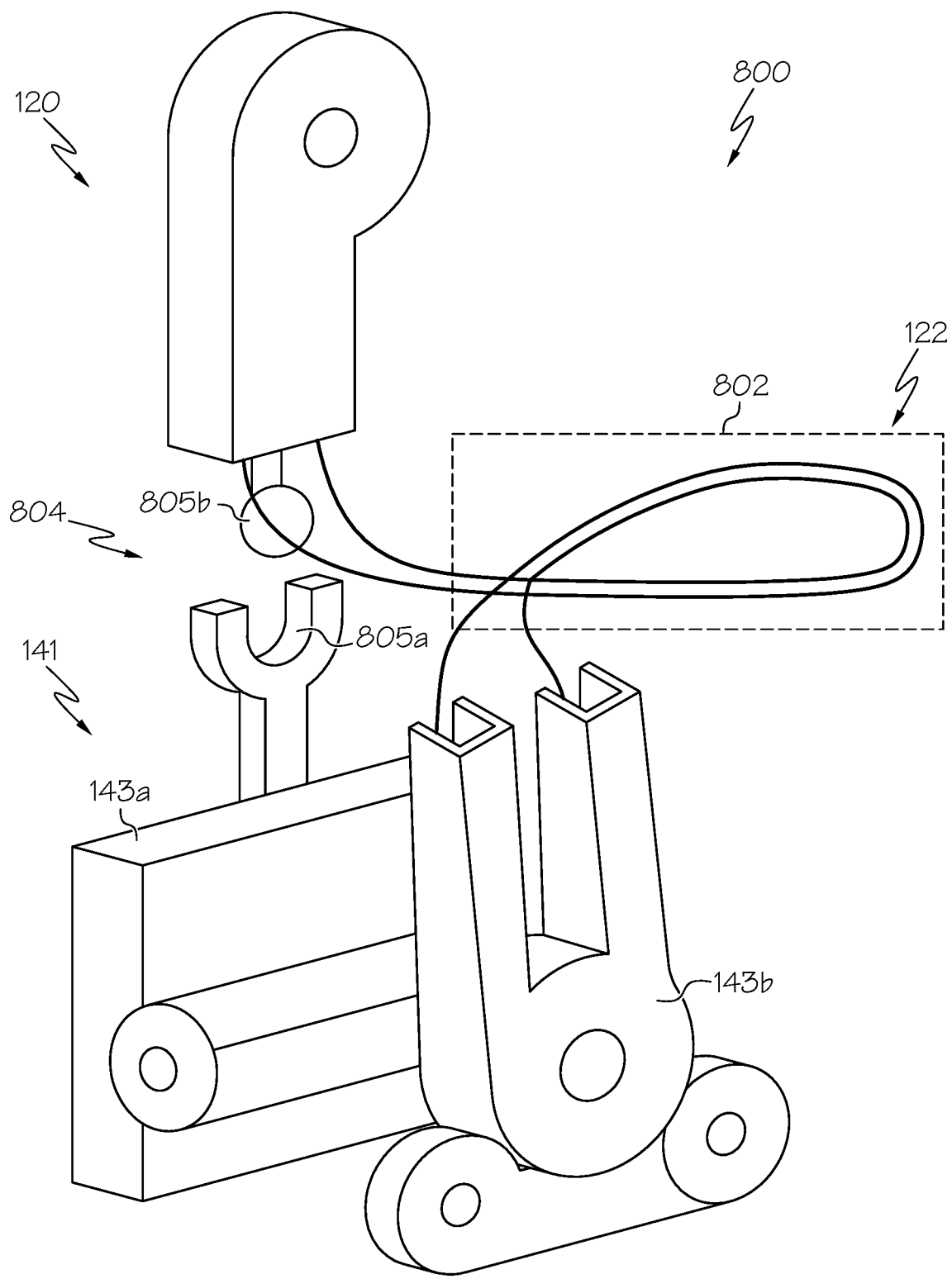
FIG. 8 schematically depicts a temporary connection assembly including a bag and a temporary connection, according to one or more embodiments shown and described herein.

FIG. 8 shows the temporary connection assembly 800 that may include a removable bag 802 and a tempset connection 804. The removable bag 802 may selectively enclose a portion of the cable 122. The removable bag 802 may temporarily enclose the cable 122, for example, during storage and/or transport or shipping of the sliding door assembly 100 or components thereof. The tempset connection 804 may be coupled to one or more of the mid-pulley assembly 120 and the first motor housing portion 143a or other component of the motor and pulley subassembly and may temporarily connect these components, for example, during installation of the mid-pulley assembly 120 and/or the first motor housing portion 143a to the door 102. In embodiments, the tempset connection 804 may be disconnected upon installation of one or more of the mid-pulley assembly 120 and the first motor housing portion 143a.

The removable bag 802 may house the cable 122 and/or other components of the actuation assembly 116, for example, during storage, transportation, and/or installation of the mid-pulley assembly 120. The removable bag 802 may be removed to unfurl the cable 122 and install the actuation assembly 116. The removable bag 802 may keep foreign objects and debris from interfering with the installation and/or operation of the cable 122 and may conveniently store the cable 122 during transit or shipping. In some embodiments, one or more portions of the removable bag 802 may remain connected to or installed on the mid-pulley assembly 120 after the mid-pulley assembly 120 is installed on the vehicle 10 and may remain installed during operation of the vehicle 10. For example, the removable bag 802 may be temporarily coupled to one or more of the mid-pulley assembly 120 and the motor and drum sub assembly 141. The removable bag 802 may selectively remain coupled to one or more of the mid-pulley assembly 120 and the motor and drum sub assembly 141 when the actuation assembly 116 is installed on the vehicle 10. The removable bag 802 may be made from a cloth, such as a canvas, polyester, nylon, or other cloth and may be relatively flexible. In other embodiments, the removable bag 802 may have an accordion-like structure as discussed herein. The removable bag 802 may couple to one or more components of the actuation assembly 116 using a temporary connection, for example, a clasp, hook-and-loop fasteners, a snap fastener, or other type of temporary fastener and may be selectively removed.

It should now be understood that sliding door assemblies for vehicles may include an actuation assembly with a motor, a pulley assembly, which may include one or more sub-assemblies, and one or more cables that may be actuated by the motor to adjust the position of a sliding door. The actuation assembly may include one or more components for inhibiting the introduction of foreign objects into the components of the actuation assembly. For example, the actuation assembly may include a unitary casing that surrounds one or more portions of the cable and inhibits grease, dirt, dust, and other foreign objects from entering the interface between the cables and the motor and the components of the mid-pulley assembly. Additionally, the unitary casing may reduce the number of system parts reducing complexity and provide support during installation of the actuation assembly into the door of the vehicle, thereby improving installation procedures by reducing installation time.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An actuation assembly for actuating a door of a sliding door assembly of a vehicle comprising:
   a motor inside a motor housing;
   a mid-pulley assembly comprising a mid-pulley wheel;
   a guide pulley assembly comprising a guide-pulley wheel; and
   a cable anchored to the vehicle and operatively coupling the mid-pulley assembly, the guide pulley assembly, and the motor;
   wherein the motor turns to move the door along the cable and at least some portion of the cable is encased in a unitary casing.

2. The actuation assembly of claim 1, further comprising:
   a first segment; and
   a second segment, wherein
   the first segment and the second segment are segments of the cable, and
   the unitary casing extends between the motor housing and the mid-pulley assembly in a longitudinal direction of a the first segment and the second segment.

3. The actuation assembly of claim 2, wherein the unitary casing surrounds both the first segment and the second segment in one or more compartments.

4. The actuation assembly of claim 3, wherein the unitary casing is removably coupled to one or more of the motor housing and the mid-pulley assembly at one or more of a top end and a bottom end of the unitary casing.

5. The actuation assembly of claim 3, wherein the unitary casing comprises an outer shell that is made from a resin composite.

6. The actuation assembly of claim 3, wherein the unitary casing comprises an accordion bag comprising a plastic sleeve with accordion style baffles.

7. The actuation assembly of claim 6, wherein the accordion bag comprises an inner divider that divides the accordion bag into two chambers.

8. The actuation assembly of claim 3, wherein the unitary casing includes a fastener along a longitudinal axis of the unitary casing and the unitary casing may be opened and closed along the longitudinal axis using the fastener.

9. The actuation assembly of claim 8, wherein the unitary casing is removable from the actuation assembly by opening and closing the fastener along the longitudinal axis of the unitary casing.

10. The actuation assembly of claim 3, wherein the unitary casing is integrated with the actuation assembly when the actuation assembly is installed in the sliding door assembly.

11. A vehicle comprising an actuation assembly for actuating a door of a sliding door assembly, the actuation assembly comprising:
- a motor inside a motor housing;
- a mid-pulley assembly comprising a mid-pulley wheel;
- a guide pulley assembly comprising a guide-pulley wheel; and
- a cable anchored to the vehicle and operatively coupling the mid-pulley assembly, the guide pulley assembly, and the motor;
- wherein the motor turns to move the door along the cable and at least some portion of the cable is encased in a unitary casing.

12. The vehicle of claim 11, further comprising:
- a first segment; and
- a second segment, wherein
- the first segment and the second segment are segments of the cable, and
- the unitary casing extends between the motor housing and the mid-pulley assembly in a longitudinal direction of a the first segment and the second segment.

13. The vehicle of claim 12, wherein the unitary casing surrounds both the first segment and the second segment in one or more compartments.

14. The vehicle of claim 13, wherein the unitary casing is removably coupled to one or more of the motor housing and the mid-pulley assembly at one or more of a top end and a bottom end of the unitary casing.

15. The vehicle of claim 13, wherein the unitary casing comprises an outer shell that is made from a resin composite.

16. The vehicle of claim 13, wherein the unitary casing comprises an accordion bag comprising a plastic sleeve with accordion style baffles.

17. The vehicle of claim 16, wherein the accordion bag comprises an inner divider that divides the accordion bag into two chambers.

18. A method of installing an actuation assembly in a sliding door assembly comprising:
- installing the actuation assembly into a door, the actuation assembly comprising a motor inside a motor housing, a mid-pulley assembly comprising a mid-pulley wheel, a guide pulley assembly comprising a guide pulley wheel, and a cable operatively coupling the mid-pulley assembly, the guide pulley assembly, and the motor, and a unitary casing surrounding at least a portion of the cable; and
- removing the unitary casing from around the first portion and the second portion.

19. The method of claim 18, wherein the unitary casing includes a fastener along a longitudinal axis of the unitary casing.

20. The method of claim 19, wherein:
- the unitary casing is removably coupled to one or more of the motor housing and the mid-pulley assembly at one or more of a top end and a bottom end of the unitary casing, the method further comprising:
- decoupling one or more of the top end and the bottom end of the unitary casing from the motor housing and the mid-pulley assembly.

\* \* \* \* \*

UNITED STATES PATENT AND TRADEMARK OFFICE
CERTIFICATE OF CORRECTION

| | |
|---|---|
| PATENT NO. | : 10,828,970 B2 |
| APPLICATION NO. | : 16/259659 |
| DATED | : November 10, 2020 |
| INVENTOR(S) | : Frank A. Richards and Tarakorn Soonthornwinate |

Page 1 of 1

It is certified that error appears in the above-identified patent and that said Letters Patent is hereby corrected as shown below:

In the Specification

In Column 5, Line(s) 26, delete "widing" and insert --winding--, therefor.

In Column 9, Line(s) 52, after "and the", delete "the".

Signed and Sealed this
Twenty-second Day of December, 2020

Andrei Iancu
*Director of the United States Patent and Trademark Office*